United States Patent
Nakamura (10) Patent No.: US 8,243,142 B2
(45) Date of Patent: Aug. 14, 2012

(54) MOBILE OBJECT IMAGE TRACKING APPARATUS AND METHOD

(75) Inventor: Hiroaki Nakamura, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 952 days.

(21) Appl. No.: 12/265,017

(22) Filed: Nov. 5, 2008

(65) Prior Publication Data

US 2009/0115850 A1   May 7, 2009

(30) Foreign Application Priority Data

Nov. 6, 2007 (JP) ................................. 2007-288967

(51) Int. Cl.
*H04N 5/225* (2006.01)
*G06K 9/00* (2006.01)

(52) U.S. Cl. ......................................... 348/169; 382/103

(58) Field of Classification Search .................. 348/169; 382/103
See application file for complete search history.

(56) References Cited

U.S. PATENT DOCUMENTS

| | | | | |
|---|---|---|---|---|
| 7,489,806 B2* | 2/2009 | Mohri et al. | ................. | 382/107 |
| 7,965,868 B2* | 6/2011 | Roberts et al. | ................ | 382/103 |
| 8,009,918 B2* | 8/2011 | Van Droogenbroeck et al. | .............................. | 382/224 |
| 2001/0055063 A1* | 12/2001 | Nagai et al. | ................... | 348/116 |
| 2003/0156736 A1* | 8/2003 | Chiu et al. | .................... | 382/103 |
| 2004/0190752 A1* | 9/2004 | Higaki et al. | ................. | 382/103 |

FOREIGN PATENT DOCUMENTS

| | | |
|---|---|---|
| JP | 2001116985 | 4/2001 |
| JP | 2004286699 | 10/2004 |
| JP | 2006106910 | 4/2006 |

* cited by examiner

*Primary Examiner* — Wing Chan
*Assistant Examiner* — David X Yi
(74) *Attorney, Agent, or Firm* — Ohlandt, Greeley, Ruggiero & Perle, L.L.P.

(57) ABSTRACT

A mobile object image tracking apparatus includes at least one unit rotating about at least one axis, a camera sensor photographing a mobile object to acquire image data, a unit detecting a tracking error as a tracking error detection value, a unit detecting an angle of the rotary unit, a unit estimating the tracking error as a tracking error estimation value, a unit selecting the tracking error detection value when the mobile object falls within the field of view, and selecting the tracking error estimation value when the mobile object falls outside the field of view, a unit computing an angular velocity instruction value used to drive the rotating unit to track the mobile object, a unit detecting an angular velocity of the rotary unit, and a unit controlling the rotating unit to make zero a difference between the angular velocity instruction value and the angular velocity.

18 Claims, 8 Drawing Sheets

MOBILE OBJECT IMAGE TRACKING APPARATUS AND METHOD

CROSS-REFERENCE TO RELATED APPLICATIONS

This application is based upon and claims the benefit of priority from prior Japanese Patent Application No. 2007-288967, filed Nov. 6, 2007, the entire contents of which are incorporated herein by reference.

BACKGROUND OF THE INVENTION

1. Field of the Invention

The present invention relates to a mobile object image tracking apparatus and method for enabling a target recognition sensor, such as a camera, to track a target that can move in every direction.

2. Description of the Related Art

In recent years, systems for tracking an object using, for example, an ITV camera, to realize continued monitoring or acquire detailed information have been produced on a commercial basis for protective service equipment employed in major facilities such as airports and manufacturing plants, lifeline facilities such as electric power plants and water networks, and traffic information support systems such as Intelligent Transport Systems (ITS). These systems include not only ground equipment type systems, but also compact ones installed in vehicles, ships or airplanes and having a vibration-proof structure. In the systems, it has come to be important to enhance their whirling speed to make them quickly point targets and sequentially track the targets.

In the above mobile object image tracking systems, their object tracking velocity is limited by the field of view of a camera sensor employed. Namely, unless a tracking error that occurs when the camera sensor photographs a mobile object falls within the field of view, the mobile object will be missed. Such a tracking error occurs because the camera sensor performs image processing for extracting a tracking error from an image obtained by photography, and hence it is difficult to reduce the interval of photography, i.e., the sampling time, of the camera sensor. This being so, when the velocity of a mobile object is increased, the object may fall outside the field of view of the camera sensor and become unable to be tracked. Further, depending upon the attitude of a gimbal mechanism employed in the systems, it is possible that the gimbal mechanism itself will instantly move at high velocity to avoid gimbal lock. In this case, the mobile object may well fall outside the field of view of the camera sensor as in the case where the velocity of the mobile object is increased. Once thus the mobile object falls outside the field of view, it is difficult to return the same from outside the field of view to inside. In addition, if the sampling interval of the camera sensor is long, an angular velocity instruction for causing the gimbal mechanism to perform tracking also is updated at long intervals. Namely, the sampling time of the control system becomes long, and this adversely affects the tracking performance, with the result that a mobile object falls outside the field of view of the camera sensor because of a tracking delay.

There is a conventional image tracking system, in which when a mobile object has shifted from inside the field of view of a camera sensor to outside, an angular velocity instruction is switched from an instruction based on a tracking error of the camera sensor, to a preset instruction, thereby pointing a gimbal mechanism toward a position outside the field of view so as to return the mobile object into the field of view (see, for example, JP-A 2006-106910 (KOKAI)).

Further, there is a conventional method, for use in an image tracking system, of overcoming a tracking disabled state using estimation. For instance, there is a method of estimating and correcting the position of a target when image information of the target cannot be acquired, by measuring the distance between the target and the image tracking system using a length-measurement sensor.

Furthermore, there is a method of compensating for tracking control by changing a tracking mode, based on the course of a target determined from the size of the target and a change in the center of gravity of the target that are detected in photographed images of the target.

In these techniques, it is difficult to issue an angular velocity instruction that enables a mobile object to be always appropriately returned into the field of view of the camera sensor. Namely, only limited occasions can be dealt with. Further, the method of measuring the distance between a target and an image tracking system requires a length-measurement sensor, and costs high. In the method of compensating for tracking control based on the size of a target and a change in the center of gravity of the target, load on image processing is increased and hence the sampling time is increased. Therefore, improvements for the above-mentioned tracking delay due to an increase in sampling time cannot be expected.

BRIEF SUMMARY OF THE INVENTION

In accordance with an aspect of the invention, there is provided a mobile object image tracking apparatus comprising: at least one rotary unit configured to rotate about at least one axis; a camera sensor configured to photograph a mobile object to acquire image data, the camera sensor being supported by the rotary unit; a first detection unit configured to detect a tracking error as a tracking error detection value, based on the image data, the tracking error being a deviation from a center of a field of view of the camera sensor; a second detection unit configured to detect an angle of the rotary unit; an estimation unit configured to estimate the tracking error as a tracking error estimation value, using the angle and a temporal differentiation value of the angle; a selection unit configured to select the tracking error detection value when the mobile object falls within the field of view, and to select the tracking error estimation value when the mobile object falls outside the field of view; a computation unit configured to compute an angular velocity instruction value used to drive the rotary unit to track the mobile object, based on the angle and a selected one of the tracking error detection value and the tracking error estimation value; a third detection unit configured to detect an angular velocity of the rotary unit; and a control unit configured to control the rotary unit to make zero a difference between the angular velocity instruction value and the angular velocity.

DETAILED DESCRIPTION OF THE INVENTION

A mobile object image tracking apparatus and method according to embodiments will be described in detail with reference to the accompanying drawings. In the embodiments described below, like reference numbers denote like elements, and no duplicated descriptions will be given.

The mobile object image tracking apparatus and method according to the embodiments are obtained by applying, to an image tracking system, a control system for a mobile object image tracking mechanism.

The mobile object image tracking apparatus and method of the embodiments exhibit excellent tracking performance without any additional sensor.

First Embodiment

Figure 1:
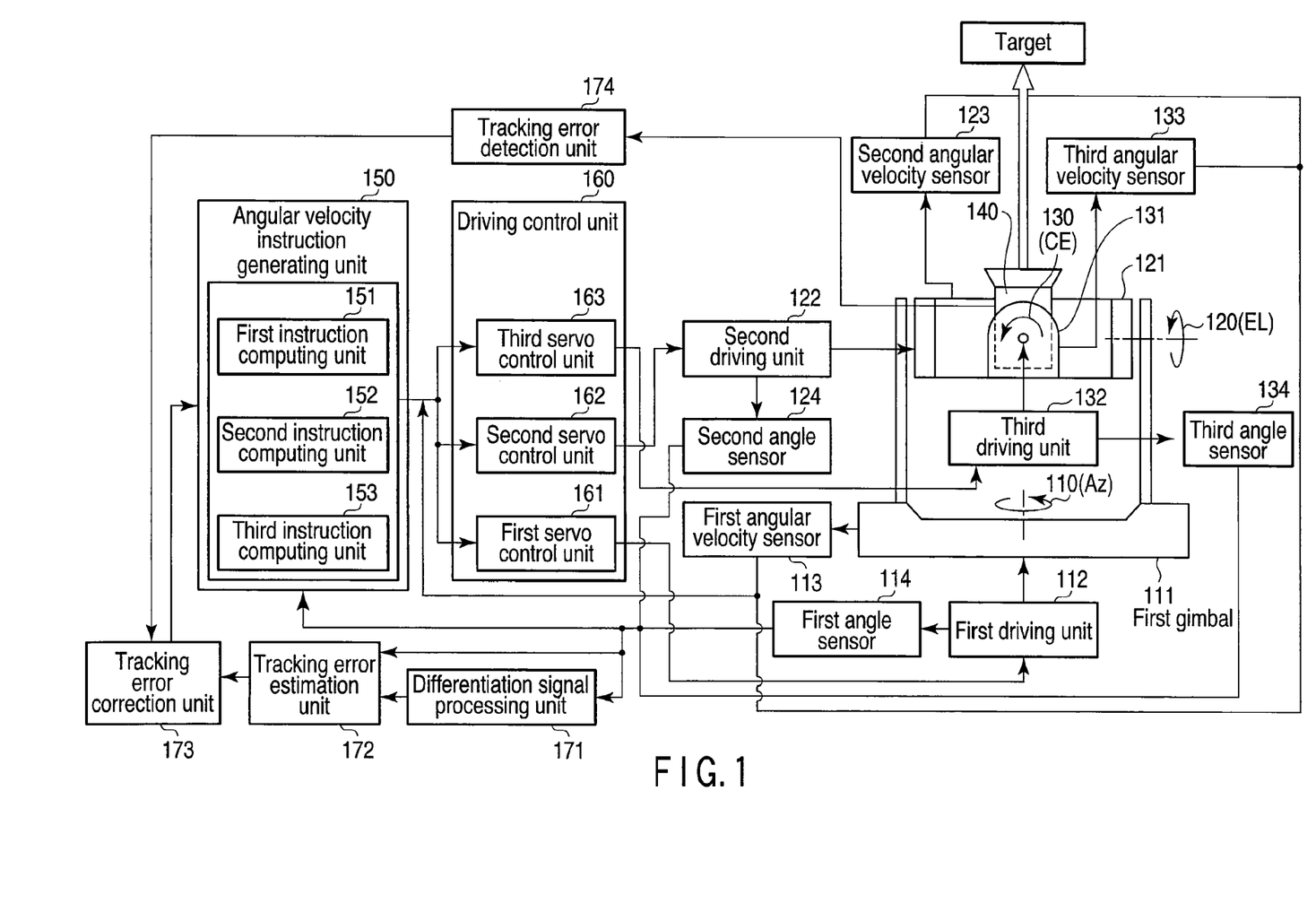
FIG. 1 is a block diagram illustrating a mobile object image tracking apparatus according to embodiments.

Referring to FIG. 1, a mobile object image tracking apparatus according to a first embodiment will be described.

The mobile object image tracking apparatus of the embodiment comprises first, second and third gimbals 111, 121 and 131, first, second and third driving units 112, 122 and 132, first, second and third angular velocity sensors 113, 123 and 133, first, second and third angle sensors 114, 124 and 134, a camera sensor 140, an angular velocity instruction generating unit 150, a driving control unit 160, a differentiation signal processing unit 171, a tracking error estimation unit 172, a tracking error correction unit 173 and a tracking error detection unit 174.

The angular velocity instruction generating unit 150 includes first, second and third instruction computing units 151, 152 and 153. The driving control unit 160 includes first, second and third servo controllers 161, 162 and 163.

The first gimbal 111 rotates about a first gimbal axis 110. The second gimbal 121 rotates about a second gimbal axis 120 that is perpendicular to the first gimbal axis 110. The third gimbal 131 rotates about a third gimbal axis 130 that is perpendicular to the second gimbal axis 120 at the intersection at which the second gimbal 121 supported by the first gimbal 111 intersects the first gimbal axis 110.

The first, second and third driving units 112, 122 and 132 rotate the first, second and third gimbals 111, 121 and 131, respectively.

The first angular velocity sensor 113 detects the angular velocity of the first gimbal 111 that rotates about the first gimbal axis 110. The second angular velocity sensor 123 detects the angular velocity of the second gimbal 121 that rotates about the second gimbal axis 120. The third angular velocity sensor 133 detects the angular velocity of the third gimbal 131 that rotates about the third gimbal axis 130.

The first angle sensor 114 detects the angle of rotation of the first gimbal 111 with respect to the second gimbal 121. The second angle sensor 124 detects the angle of rotation of the second gimbal 121 with respect to the third gimbal 131. The third angle sensor 134 detects the angle of rotation of the third gimbal 131 with respect to a gimbal fixing unit (not shown).

The camera sensor 140 is supported by the third gimbal 131 and used to detect a mobile object and produce image data thereof.

The tracking error detection unit 174 performs image processing on image data obtained from the camera sensor 140, to detect a tracking error. In general, the tracking error detection unit 174 digitizes the image data to obtain monochrome image data, extracts the characterizing point of the mobile object to determine the position thereof in the field of view of the camera, and detects two-directional displacements ($\Delta X$, $\Delta Y$) from the center of the field of view, as tracking error detection values. The time required for the above process including image processing is regarded as a sampling time for obtaining tracking error detection values. The tracking error detection values will be described later with reference to FIGS. 4 and 5.

The angular velocity instruction generating unit 150 generates angular velocity instruction values for driving the gimbals to track a mobile object, based on the two-directional tracking errors obtained from the tracking error correction unit 173, and the angle detection values ($\theta_1$, $\theta_2$, $\theta_3$) of the three axes, which indicate the attitudes of the gimbals and are detected by the first, second and third angle sensors 114, 124 and 134. This process will be described later in detail with reference to FIG. 3.

The first instruction computing unit 151 computes a first angular velocity instruction value for driving the first gimbal 111 during target tracking, based on two-directional tracking errors acquired from the tracking error correction unit 173 and angle data acquired from the first, second and third angle sensors 114, 124 and 134. The second instruction computing unit 151 computes a second angular velocity instruction value for driving the second gimbal 121 via the route of reducing the rotational reaction force of the first gimbal 111, based on two-directional tracking errors acquired from the tracking error correction unit 173 and angle data acquired from the first, second and third angle sensors 114, 124 and 134. The third instruction computing unit 151 computes a third angular velocity instruction value for driving the third gimbal 131, based on two-directional tracking errors acquired from the tracking error correction unit 173 and angle data acquired from the first, second and third angle sensors 114, 124 and 134.

The driving control unit 160 computes a control value for making zero the difference between each angular velocity instruction value generated by the angular velocity instruction generating unit 150, and the corresponding one of the angular velocities detected by the first, second and third angle sensors 114, 124 and 134. The first, second and third servo controllers 161, 162 and 163 correspond to the first, second and third angular velocity sensors 113, 123 and 133, respectively, and output control values to the first, second and third driving units 112, 122 and 132.

The differentiation signal processing unit 171 receives data of angles detected by the first, second and third angle sensors 114, 124 and 134, and performs temporal differentiation on the angle data to compute their angular velocities.

The tracking error estimation unit 172 receives data of angles detected by the first, second and third angle sensors 114, 124 and 134, and receives their angular velocities from the differentiation signal processing unit 171 to acquire a tracking error. This process will be described later in detail with reference to FIG. 3.

The tracking error correction unit 173 receives a tracking error estimation value from the tracking error estimation unit 172, and a tracking error detection value from the tracking error detection unit 174, and outputs one of the error values depending upon whether the tracking error falls within the field of view of the camera sensor.

Figure 2:
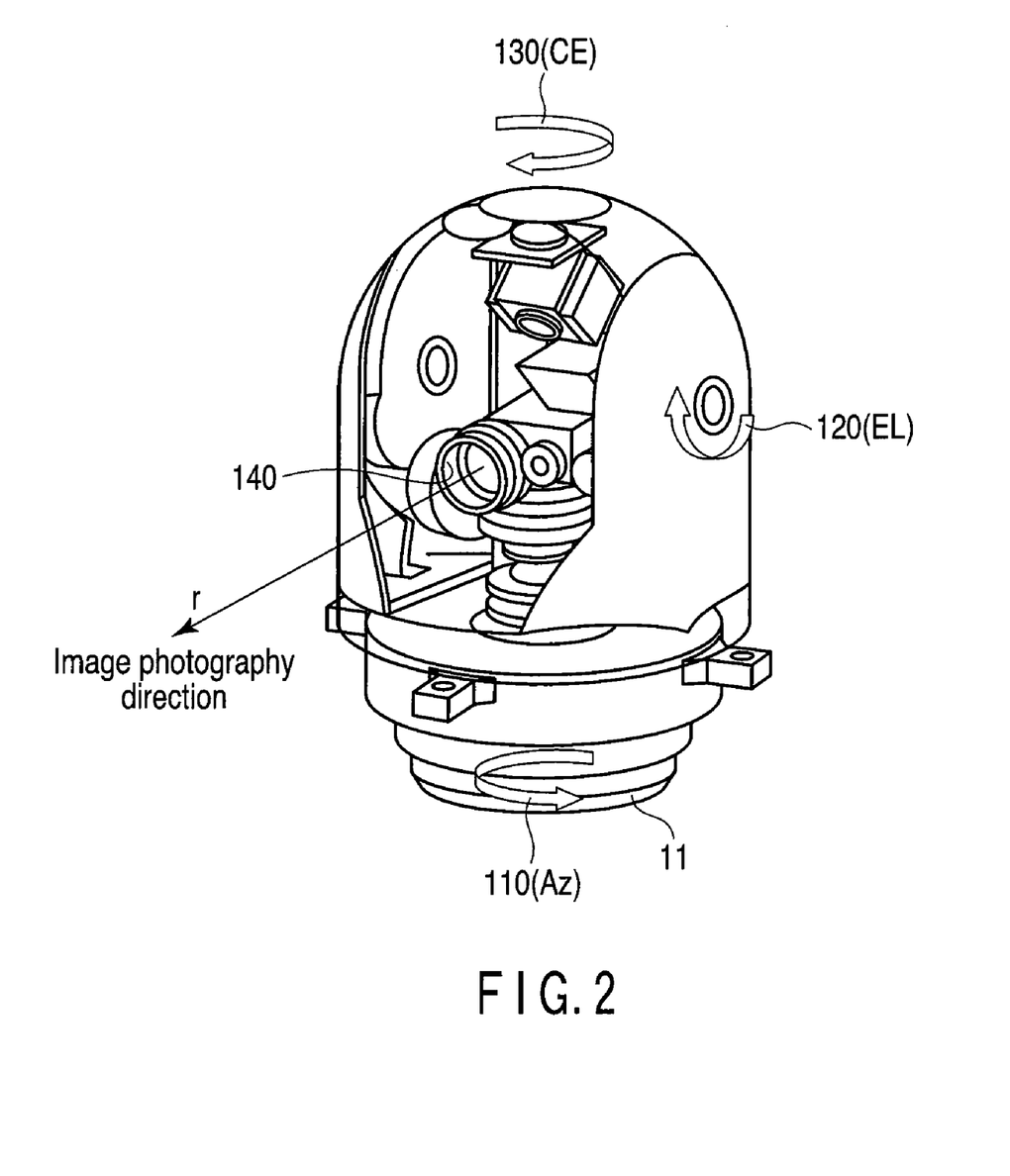
FIG. 2 is a perspective view illustrating the camera sensor shown in FIG. 1 and its peripheral portion.

The camera sensor used in the embodiment will be described with reference to FIG. 2.

The first gimbal axis 110 is an azimuth axis (hereinafter referred to simply as the "Az axis"), the second gimbal axis 120 is an elevation axis (hereinafter referred to simply as the "EL axis"), and the third gimbal axis 130 is a cross elevation axis (hereinafter referred to simply as the "CE axis"). The mobile object image tracking apparatus shown in FIG. 1 is a triaxial rotary apparatus having three axes, in which the Az axis 110, EL axis 120 and CE axis 130 intersect at one point.

Figure 3:
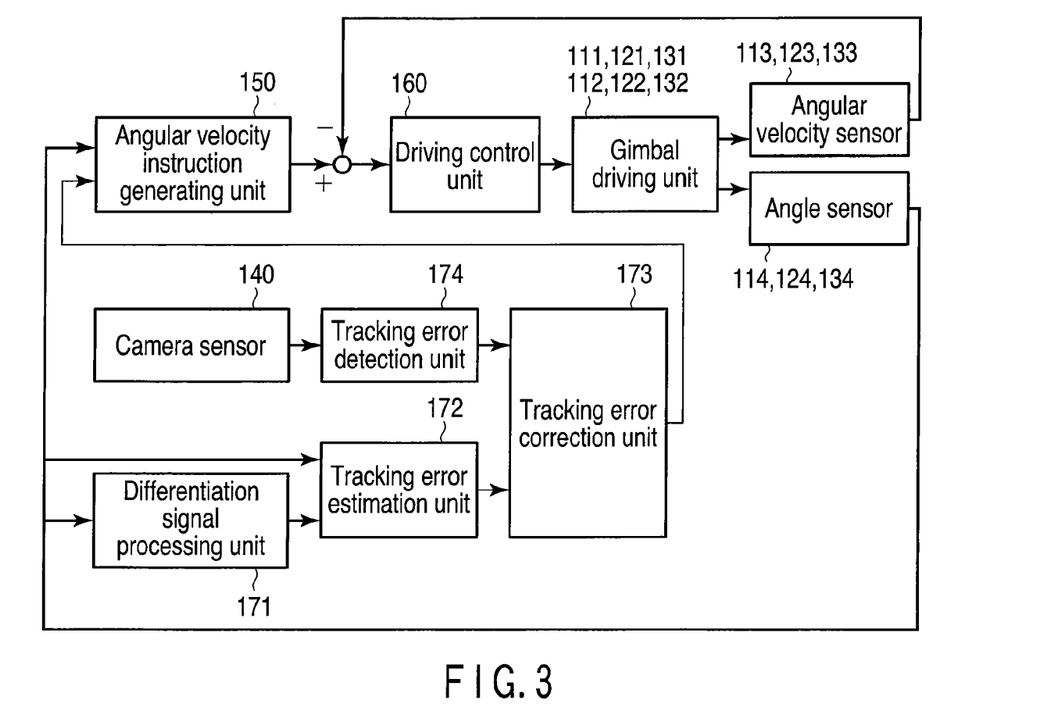
FIG. 3 is a block diagram illustrating a correction control system employed in the mobile object image tracking apparatus of the embodiments.

Referring then to FIG. 3, a description will be given of a correction control system incorporated in the mobile object image tracking apparatus of the embodiment. FIG. 3 is a block diagram illustrating control related to three axes of the Az axis, EL axis and CE axis. In the correction control system of the embodiment, the camera sensor 140 obtains a tracking error detection value within the field of view of the camera sensor when it is tracking an object, and the tracking error estimation unit 172 performs tracking error estimation based on angle data indicating the angles of the gimbals. For tracking error estimation, the following matrix is used for acquiring tracking error components ($\Delta X_m$, $\Delta Y_m$) related to the angles and angular velocities of the gimbals:

$$\begin{bmatrix} \Delta X_m \\ \Delta Y_m \end{bmatrix} = J \begin{bmatrix} \theta_1 \\ \theta_2 \\ \theta_3 \end{bmatrix} \quad (1)$$

where matrix J is a Jacobian matrix derived from differentiation of the relationship between the attitudes of gimbals and the visual axis vector of a camera sensor. In the case of a three-axis gimbal structure, the following matrix is given:

$$J = \begin{pmatrix} j_{11}(\theta_1, \theta_2, \theta_3) & j_{22}(\theta_1, \theta_2, \theta_3) & j_{13}(\theta_1, \theta_2, \theta_3) \\ j_{21}(\theta_1, \theta_2, \theta_3) & j_{22}(\theta_1, \theta_2, \theta_3) & j_{23}(\theta_1, \theta_2, \theta_3) \end{pmatrix} \quad (2)$$

For instance, in the gimbal structure of the embodiment, the following matrix is used:

$$J = \begin{pmatrix} -\cos(\theta_2) & 0 & -1 \\ \sin(\theta_2)\sin(\theta_3) & \cos(\theta_3) & 0 \end{pmatrix} \quad (3)$$

Using this matrix, a tracking error on the camera sensor can be related to the angles and angular velocities of the gimbals. In the matrix, data obtained from the first, second and third angle sensors 114, 124 and 134 can be directly used as angle information. Although data having angular velocity dimension is detected by the first, second and third angular velocity sensors 113, 123 and 133, it is not advantageous to use the values of the angular velocity sensors since the above matrix needs the angular velocities unique to the gimbals, and the values of the angular velocity sensors may be changed by other elements, and the detection ranges of the sensors are limited. In the embodiment, the differentiation signal processing unit 171 carries out temporal differentiation on angles to compute their angular velocities, and the tracking error estimation unit 172 uses the computed angular velocities. This eliminates the influence of the angular velocity sensors. It is desirable that the differentiation signal processing unit 171 should carry out differentiation signal processing having differentiation characteristic and lowpass characteristic in light of an increase in high-frequency component due to differentiation. Thus, the tracking error estimation unit 172 can obtain tracking error estimation values.

Using the thus-obtained tracking error estimation values, the tracking error correction unit 173 carries out correction of tracking errors that exist outside the field of view of the camera sensor. When a tracking error exists within the field of view, the tracking error correction unit 173 uses a tracking error detection value detected by the tracking error detection unit 174 in an image acquired from the camera sensor. In contrast, when a tracking error exists outside the field of view, the tracking error correction unit 173 uses a tracking error estimation value obtained from the tracking error estimation unit 172.

The angular velocity instruction generating unit 150 generates the following angular velocity instruction values used to drive the gimbals to track a mobile object, based on the two-directional tracking errors acquired from the tracking error correction unit 173 and the angular detection values ($\theta_1$, $\theta_2$, $\theta_3$) of the three axes indicating the attitudes of gimbals detected by the first, second and third angle sensors 114, 124 and 134:

$$\dot{\theta}r_1, \dot{\theta}r_2, \dot{\theta}r_3$$

JP-A 2006-106910 (KOKAI) discloses a method of supplying the axes of the triaxial gimbal structure with data indicating respective angular velocities, based on a two-directional image. If the relationship between tracking errors, angles and angular velocity instruction values is expressed by such a general form as disclosed in this publication, the following equation is given $$\begin{bmatrix} \dot{\theta}r_1 \\ \dot{\theta}r_2 \\ \dot{\theta}r_3 \end{bmatrix} = M_J \begin{bmatrix} \Delta X \\ \Delta Y \end{bmatrix} + \begin{bmatrix} \alpha_1(\theta_1, \theta_2, \theta_3) \\ \alpha_2(\theta_1, \theta_2, \theta_3) \\ \alpha_3(\theta_1, \theta_2, \theta_3) \end{bmatrix} \quad (4)$$

where matrix $M_J$ used for computing components determined from tracking errors is given by the following equation determined from triaxial coordinate conversion of a triaxial gimbal structure:

$$M_J = \begin{bmatrix} m_{11}(\theta_1, \theta_2, \theta_3) & m_{12}(\theta_1, \theta_2, \theta_3) & m_{13}(\theta_1, \theta_2, \theta_3) \\ m_{21}(\theta_1, \theta_2, \theta_3) & m_{22}(\theta_1, \theta_2, \theta_3) & m_{23}(\theta_1, \theta_2, \theta_3) \\ m_{31}(\theta_1, \theta_2, \theta_3) & m_{32}(\theta_1, \theta_2, \theta_3) & m_{33}(\theta_1, \theta_2, \theta_3) \end{bmatrix} \quad (5)$$

In JP-A 2006-106910 (KOKAI), angular velocities are supplied to the respective axes with triaxial redundancy for avoiding the zenith realized, using the following redundancy elements:

$\alpha_1(\theta_1,\theta_2,\theta_3)$
$\alpha_2(\theta_1,\theta_2,\theta_3)$
$\alpha_3(\theta_1,\theta_2,\theta_3)$ It can easily be known by analogy that triaxial redundancy suitable for another object can be realized by changing constraint elements.

Although the above equations are suitable for a triaxial gimbal structure, a gimbal structure of more or less than three axes can also be expressed by equations of different dimensions.

Thus, the driving control unit 160 computes control values to make, zero, the differences between the respective angular velocity instruction values generated by the angular velocity instruction generating unit 150, and the angular velocity detection values detected by the first, second and third angular velocity sensors 113, 123 and 133, whereby the gimbal mechanism is driven to track a mobile object in accordance with the control values. The gimbal mechanism includes the first, second and third gimbals 111, 121 and 131, first, second and third driving units 112, 122 and 132.

The mobile object image tracking apparatus operates as described above to generate angular velocity instructions for enabling appropriate tracking to be performed even outside the field of view of the camera sensor.

Figure 4:
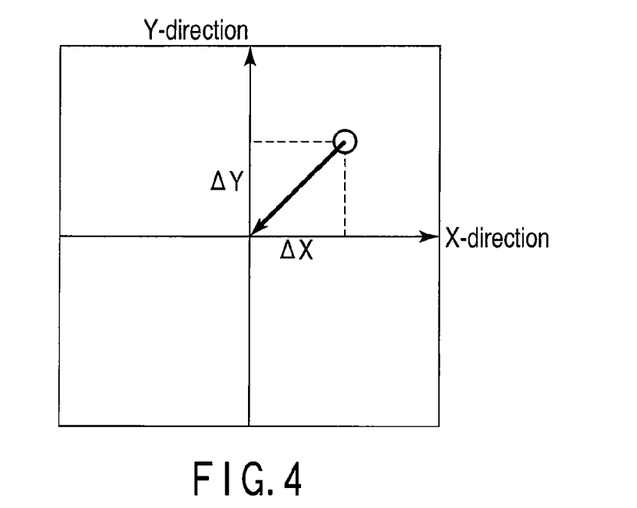
FIG. 4 is a view illustrating a tracking error detection value obtained when a mobile object exists within the field of view of a camera sensor.
Figure 5:
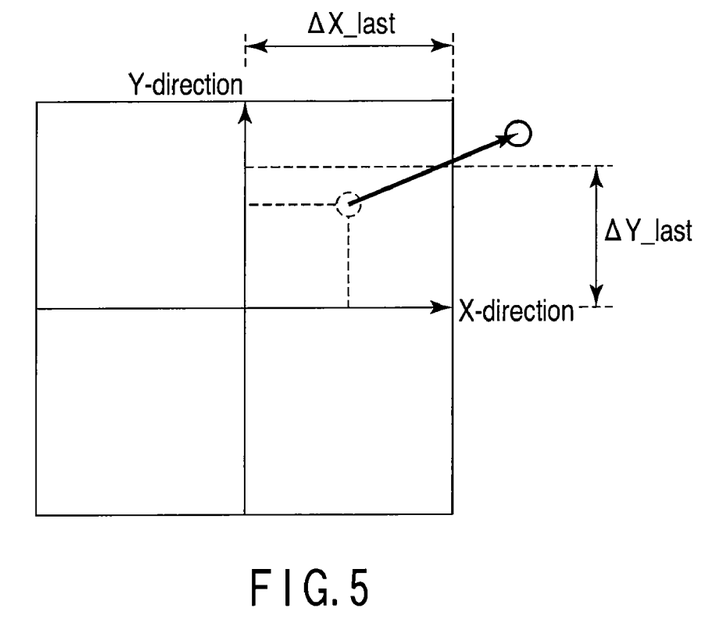
FIG. 5 is a view illustrating a tracking error detection value obtained when a mobile object exists outside the field of view of the camera sensor.

Referring then to FIGS. 4 and 5, a description will be given of the field of view obtained by the camera sensor 140, and mobile object tracking performed based on the image.

FIG. 4 is a schematic view illustrating the relationship between the field of view of the camera sensor and mobile object tracking in the embodiment. When a mobile object is in the field of view of the camera sensor, tracking error detection values ($\Delta X$, $\Delta Y$) are obtained as displacements from the center of the camera sensor. Since a tracking delay occurs, tracking error detection values that fall outside the field of view are unallowable. When the velocity of a mobile object is increased, or when the attitudes of the gimbals are abruptly changed to avoid anomalous attitudes, it is strongly possible that the mobile object will fall outside the field of view. In this case, tracking is impossible.

FIG. 5 shows a case where a mobile object is outside the field of view of the camera sensor. If a tracking error falls outside the field of view, update of the tracking error detection value is stopped. In the case of FIG. 5, the X-directional component falls outside the field of view. At this time, the last X-directional value $\Delta X\_last$ is kept at its upper limit, and the last Y-directional value $\Delta Y\_last$ is kept at a value less than its upper value and assumed before it falls outside the field of view. Once the mobile object falls outside the field of view, it is difficult to return the same into the field of view. In the prior art, there is a method of estimating an angular velocity instruction for returning a mobile object into the field of view, by carrying out linear interpolation on the last tracking error detection values ($\Delta X\_last$, $\Delta Y\_last$). However, the accuracy of estimation is not so high.

Figure 6:
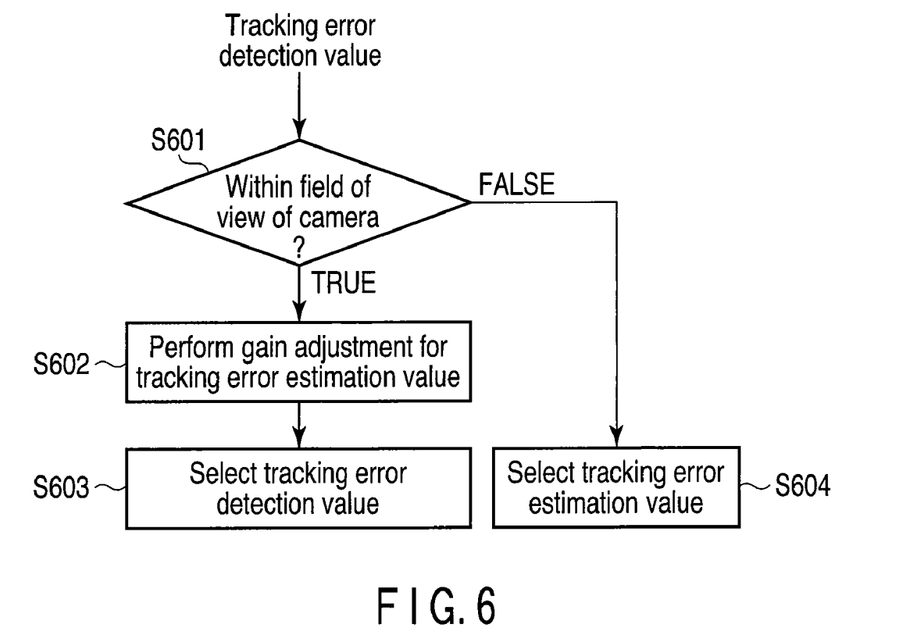
FIG. 6 is a flowchart illustrating an operation example of the tracking error correction unit shown in FIGS. 1 and 3, according to a first embodiment.

Referring to FIG. 6, a description will be given of an operation example of the tracking error correction unit 173.

Firstly, the tracking error correction unit 173 determines whether a mobile object falls within the field of view of the camera sensor, based on a tracking error detection value obtained from the tracking error detection unit 174 (step S601). If the unit 173 determines that the mobile object falls within the field of view, it adjusts its gain to match the amplitude of a tracking error estimation value obtained from the tracking error estimation unit 172, with that of the tracking error detection value (step S602). After that, the unit 173 selects and transfers the tracking error detection value to the angular velocity instruction generating unit 150 (step S603). In contrast, if the unit 173 determines that the mobile object falls outside the field of view, it selects the tracking error estimation value obtained from the tracking error estimation unit 172, and transfers the same to the angular velocity instruction generating unit 150 (step S604). At step S604, a tracking error estimation value obtained using a gain, which has been adjusted at step S602 after the steps of FIG. 6 are executed, is selected. By thus comparing the tracking error detection value with the tracking error estimation value and adjusting the gain to match the amplitude of the tracking error estimation value with that of the tracking error detection value, a more accurate error estimation value can be acquired.

Figure 7:
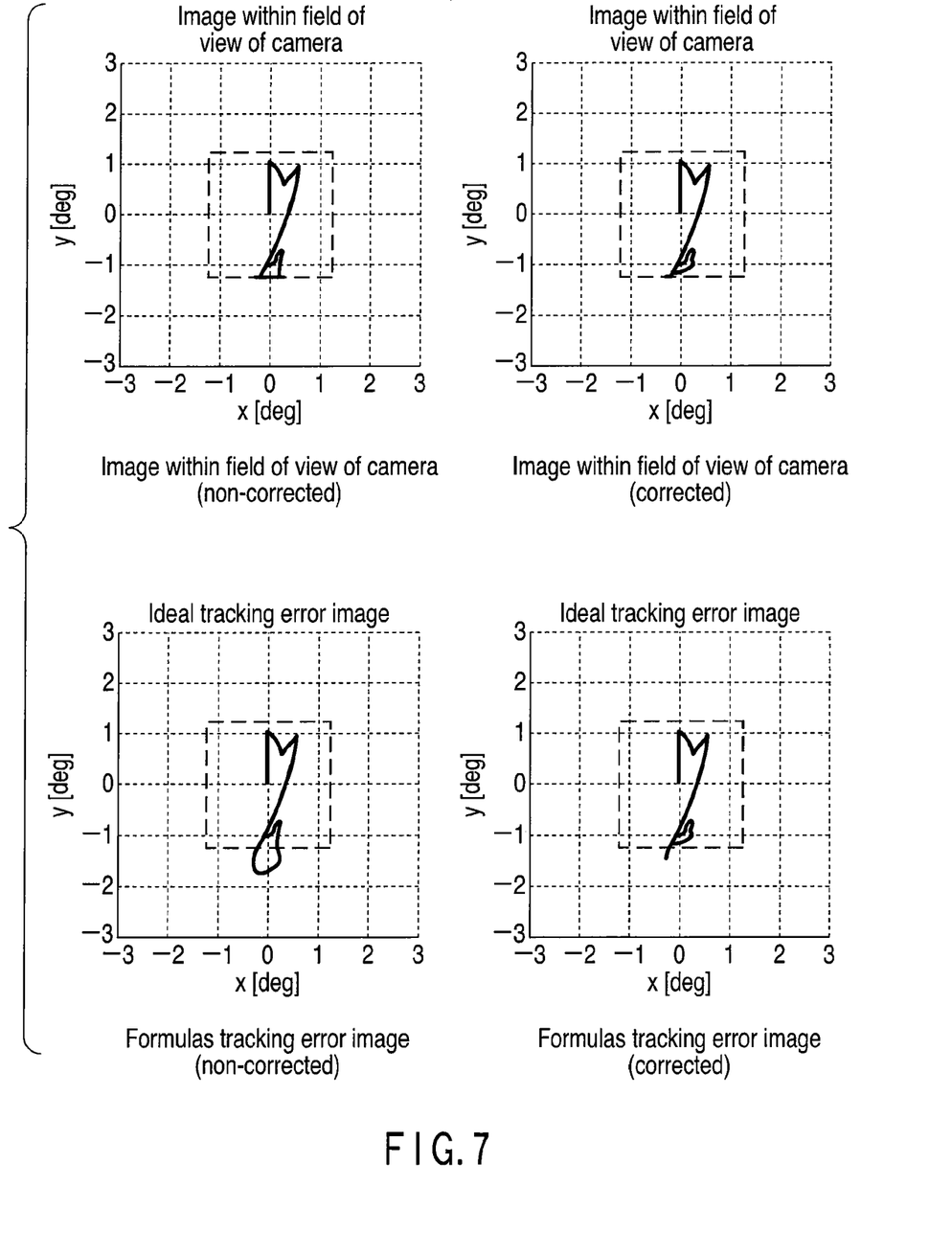
FIG. 7 is a view illustrating the trajectories of a mobile object falling inside and outside the field of view of the camera.
Figure 8:
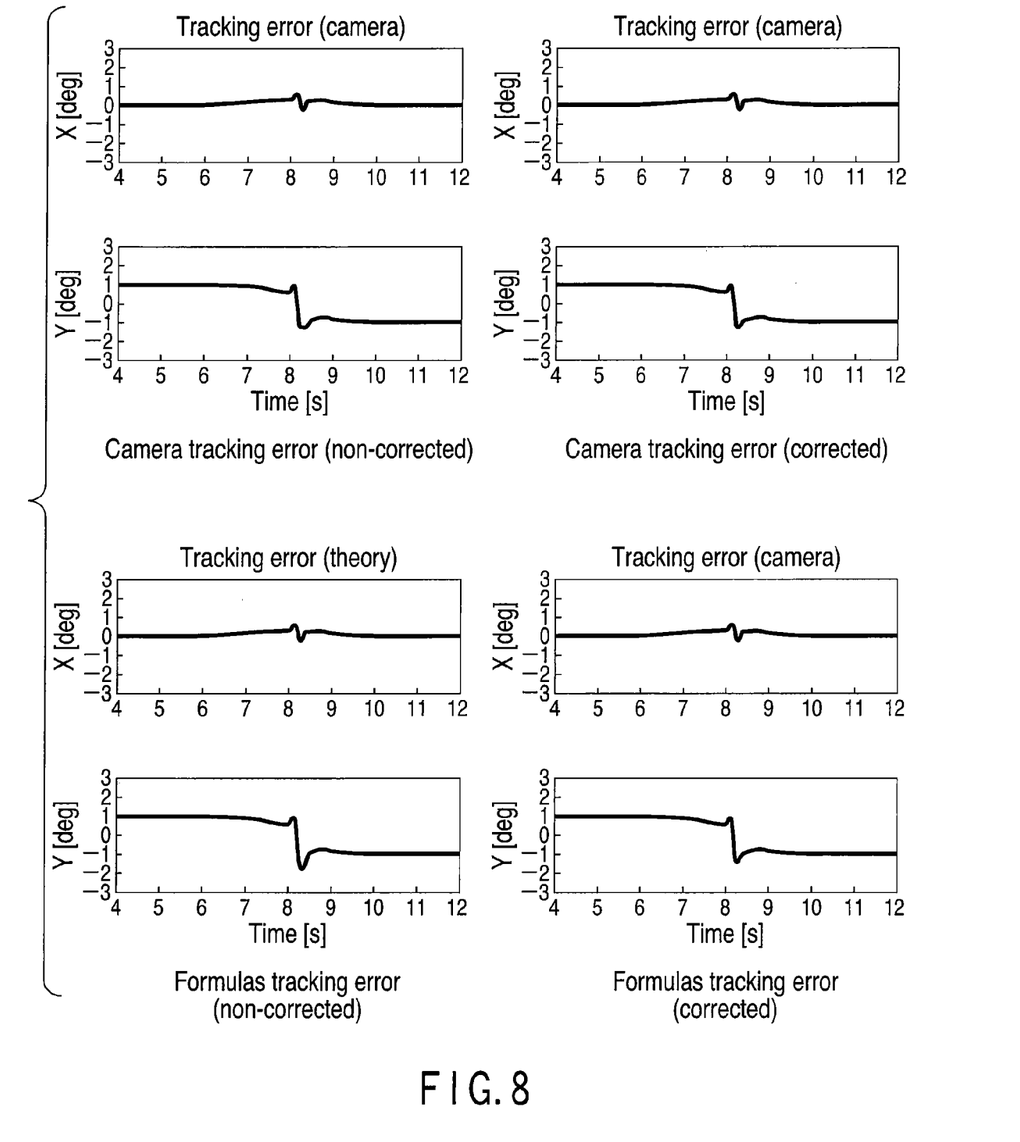
FIG. 8 is a view illustrating the x- and y-components of FIG. 7 that vary with time.
Figure 9:
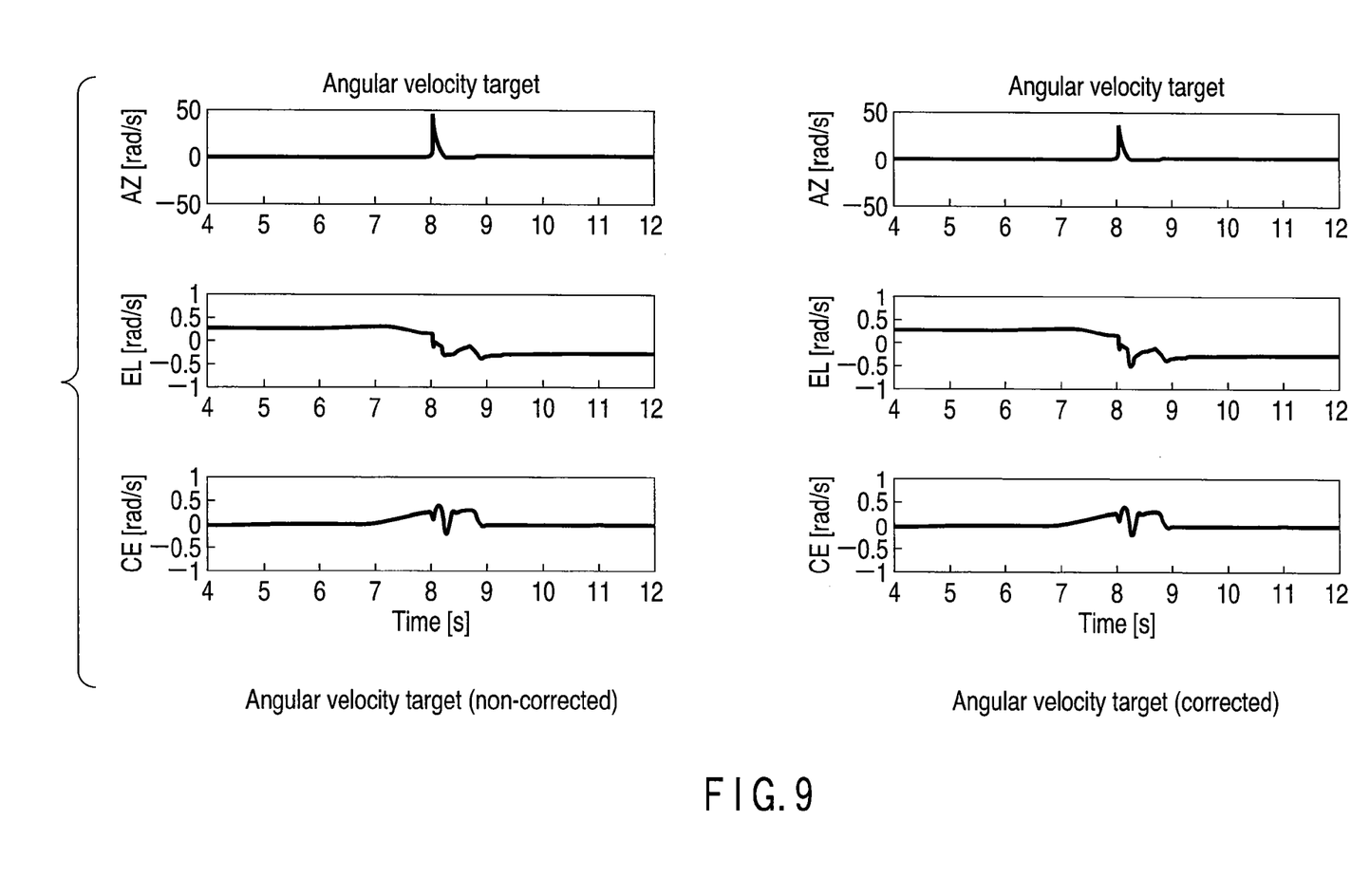
FIG. 9 is a view illustrating angular velocity values output from the angular velocity instruction generating unit shown in FIGS. 1 and 3 to gimbals.

Referring then to FIGS. 7 to 9, a description will be given of examples of changes in tracking error that occur, depending upon whether the mobile object image tracking apparatus of the embodiment executes correction control, when the gimbals have instantly performed high-velocity operation to avoid the zenith.

When passing the zenith, each of the gimbals has its Az axis greatly rotated from the front to the rear, with the result that it is strongly possible that delay in tracking the mobile object will occur, because of the limitation of the gimbal driving characteristics.

In FIG. 7, the area enclosed by the broken line corresponds to the field of view of the camera sensor. In the left-hand two graphs of FIG. 7 in which no correction is performed, it is apparent that the mobile object is significantly deviated from the field of view of the camera sensor in an area substantially corresponding to $-0.2 \leq x \leq 0.2$ and $-1.3 \leq y$. In contrast, in the right-hand two graphs of FIG. 7 in which correction has been performed, it is apparent that although the mobile object is deviated from the field of view of the camera sensor in an area substantially corresponding to $-0.2 \approx x$ and $-1.3 \leq y$, the area of deviation is smaller than in the case of no correction, and the mobile object is quickly returned into the field of view.

FIG. 8 shows the relationship between the x- and y-components and time of each graph of FIG. 7. The graphs "Camera tracking error" in FIG. 8 correspond to the graphs "Image in the field of view of camera" in FIG. 7, and the graphs "Formula tracking error" in FIG. 8 correspond to the graphs "Formula tracking error image" in FIG. 7. In the graph "Camera tracking error (without correction)" of FIG. 8, it can be understood that the curve is saturated at the position of Y=−1.2 and $8.2 \leq Time \leq 8.4$. This curve portion corresponds to the area in FIG. 7 in which the mobile object is greatly deviated from the field of view of the camera sensor. In contrast, in the graph "Camera tracking error (with correction)" of FIG. 8, almost no saturation is found. This is because, in the case of "Camera tracking error (with correction)" of FIG. 8, the mobile object is slightly deviated from the field of view, and is quickly returned into the same.

FIG. 9 shows respective angular velocity instruction values output from the angular velocity instruction generating unit 150 to the first, second and third gimbals 111, 121 and 131. In FIG. 9, the most remarkable difference is found between the graphs concerning the angular velocity target value (EL) of the second gimbal 121. In this case, in the graph "Angular velocity target (without correction)," the value EL is maintained at approx. −0.3 at a time of approx. 8.3 sec., whereas in the graph "Angular velocity target (with correction)," the value EL acutely changes between −0.3 to −0.5. This indicates that the second gimbal 121 more quickly tracks the mobile object in the case of the "Angular velocity target (with correction)" than in the case of "Angular velocity target (without correction)."

As described above, where correction based on estimation is not performed, when the mobile object reaches the limit of the field of view of the camera sensor, ΔY is kept at an angle error upper limit, and hence the angular velocity instruction is not updated. As a result, appropriate gimbal control cannot be executed to degrade the tracking characteristic. In the conventional control system, since an angular velocity instruction value is generated based on the error detection value of the camera sensor, there is a limit on the velocity of the mobile object that can be tracked by the field of view of the camera sensor. Namely, since the conventional control system is a feedback system, tracking errors inevitably occur.

In contrast, in the embodiment, since correction based on estimation is performed, even when the mobile object reaches the limit of the field of view of the camera sensor, a gimbal angular velocity instruction suitable for the outside of the field of view can be generated by estimation in the next sampling cycle. This can reduce a tracking error and hence return the mobile object into the field of view.

As described above, in the above-described first embodiment, tracking error estimation based on angular data enables an angular velocity instruction suitable for tracking to be generated even when update of the tracking error detection value is stopped because a mobile object falls outside the field of view of the camera sensor, with the result that the tracking performance is improved.

Second Embodiment

In a correction control system incorporated in a mobile object image tracking apparatus according to a second embodiment, the sampling time of the camera sensor is measured using, for example, an N-dividing clock for dividing the sampling time of the camera sensor into N divisions, and a tracking error estimation value is computed based on the measured value. The N-dividing clock is used to determine the driving times of the first, second and third gimbals 111, 121 and 131. The mobile object image tracking apparatus of the second embodiment is similar to that of the first embodiment in structure, but differs therefrom in operation. For realizing the different operation, the tracking error correction unit 173 includes a counter for counting clock values.

Figure 10:
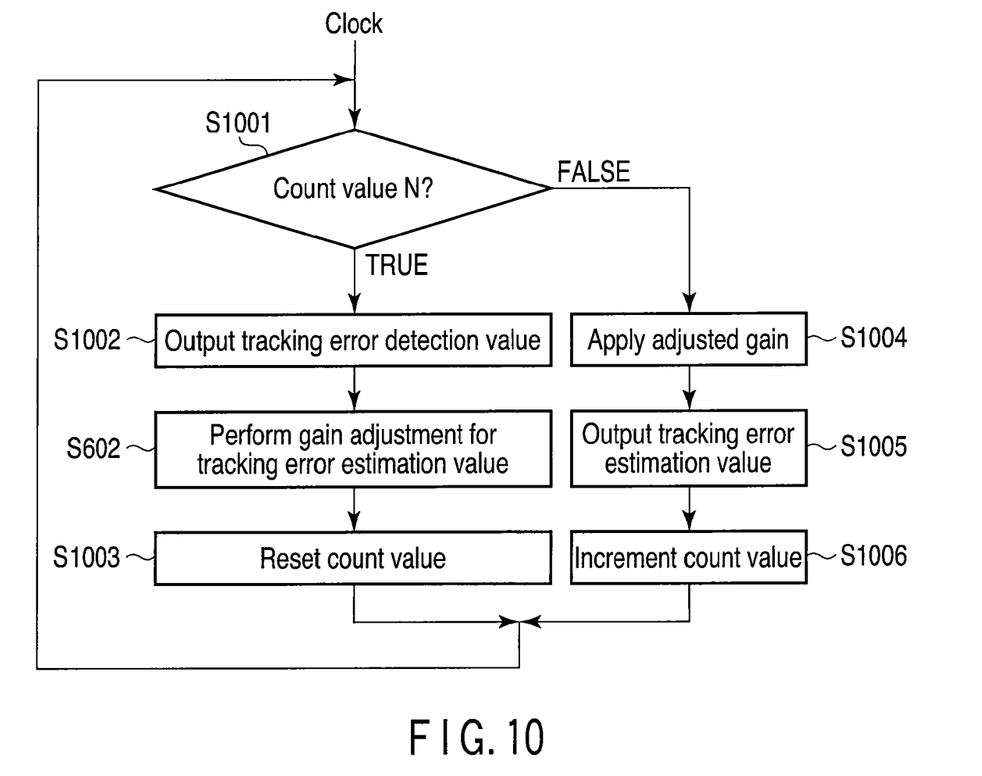
FIG. 10 is a flowchart illustrating an operation example of the tracking error correction unit shown in FIGS. 1 and 3, according to a second embodiment.

Referring to FIG. 10, a description will be given of an operation example of the tracking error correction unit 173 of the mobile object image tracking apparatus according to the second embodiment.

Firstly, the number of clocks is counted to determine whether the count value reaches N (step S1001). If it is determined that the count value reaches N, the tracking error correction unit 173 outputs a tracking error detection value with no correction to the angular velocity instruction generating unit 150 (step S1002). When the count value reaches N, the camera sensor performs sampling. After that, the tracking error detection value is compared with a tracking error estimation value computed in synchronism with the N-dividing clock, thereby performing gain adjustment (step S602). After finishing this process, the count value is reset (step S1003).

If it is determined that the count value does not reach N, the gain adjusted at step S602 is applied to the tracking error estimation value (step S1004). When the count value does not reach N, the camera sensor does not perform sampling. In other words, the time when the count value does not reach N corresponds to the time between the times when sampling is performed. The resultant tracking error estimation value is output to the angular velocity instruction generating unit 150 (step S1005). At this time, the count value is not reset but incremented (step S1006).

Namely, during the time between the sampling times of the camera sensor (i.e., during the time when the camera sensor does not perform sampling), the adjusted gain is applied to the tracking error estimation value, and the resultant estimation value is output to the angular velocity instruction generating unit 150, and the counting is continued. Iteration of this process makes it possible to generate an angular velocity instruction for mobile object tracking, based on tracking error data which has been updated at short intervals and in which the sampling times of the camera sensor are corrected using estimation values. As a result, tracking performance is improved.

The above-described mobile object image tracking apparatuses according to the first and second embodiments, in which tracking errors outside the field of view of the camera sensor can be corrected, and the sampling times or intervals of the camera sensor can be corrected, are applicable to mobile tracking apparatuses of a gimbal structure provided with, for example, a TV camera, cameral seeker and automatic measuring machine.

In the above-described embodiments, even when a mobile object falls outside the field of view of the camera sensor, and hence update of a tracking error detection value is stopped, thereby making it impossible to generate an appropriate angular velocity instruction for the gimbal structure, a tracking error estimation value is computed based on angle detection data and is used to correct the tracking error, thereby generating an appropriate angular velocity instruction for image tracking and improving the tracking performance.

Further, in the embodiments, since the sampling time of the camera sensor is corrected using a tracking error estimation value computed based on angle detection data, an angular velocity instruction for image tracking can be generated at high sampling speed, thereby further improving the tracking performance.

Yet further, since the tracking error of a mobile object is estimated and corrected using angle data obtained by angle detection means, no dedicated sensor is needed, and therefore the tracking performance of the apparatus can be improved without increasing the cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile object image tracking apparatus comprising:
    at least one rotary unit configured to rotate about at least one axis;
    a camera sensor configured to photograph a mobile object to acquire image data, the camera sensor being supported by the rotary unit;
    a first detection unit configured to detect a tracking error as a tracking error detection value, based on the image data, the tracking error being a deviation from a center of a field of view of the camera sensor;

a second detection unit configured to detect an angle of the rotary unit;

an estimation unit configured to estimate the tracking error as a tracking error estimation value, using the angle and a temporal differentiation value of the angle;

a selection unit configured to select the tracking error detection value when the mobile object falls within the field of view, and to select the tracking error estimation value when the mobile object falls outside the field of view;

wherein the selection unit compares the tracking error detection value with the tracking error estimation value, and adjusts the tracking error estimation value to match an amplitude of the tracking error estimation value with an amplitude of the tracking error detection value;

a computation unit configured to compute an angular velocity instruction value used to drive the rotary unit to track the mobile object, based on the angle and a selected one of the tracking error detection value and the tracking error estimation value;

a third detection unit configured to detect an angular velocity of the rotary unit; and a control unit configured to control the rotary unit to make zero a difference between the angular velocity instruction value and the angular velocity.

2. The apparatus according to claim 1, wherein the estimation unit acquires the tracking error estimation value, using, as the temporal differentiation value, an angular velocity dimension value obtained by signal processing of data related to the angle, and also using a relationship between the tracking error, the angle of the rotary unit, and the angular velocity of the rotary unit.

3. The apparatus according to claim 2, wherein the selection unit compares the tracking error detection value with the tracking error estimation value, and adjusts the tracking error estimation value to match an amplitude of the tracking error estimation value with an amplitude of the tracking error detection value.

4. The apparatus according to claim 2, wherein the computation unit computes the angular velocity instruction using the tracking error estimation value, during a time when the tracking error detection value related to the image data acquired by the camera sensor is not updated.

5. The apparatus according to claim 2, wherein the computation unit computes the angular velocity instruction value using a relationship between the tracking error, the angle of the rotary unit, and the angular velocity of the rotary unit.

6. The apparatus according to claim 1, wherein the computation unit computes the angular velocity instruction using the tracking error estimation value, during a time when the tracking error detection value related to the image data acquired by the camera sensor is not updated.

7. The apparatus according to claim 1, wherein the computation unit computes the angular velocity instruction value using a relationship between the tracking error, the angle of the rotary unit, and the angular velocity of the rotary unit.

8. The apparatus according to claim 1, wherein the computation unit computes the angular velocity instruction using the tracking error estimation value, during a time when the tracking error detection value related to the image data acquired by the camera sensor is not updated.

9. The apparatus according to claim 1, wherein the computation unit computes the angular velocity instruction value using a relationship between the tracking error, the angle of the rotary unit, and the angular velocity of the rotary unit.

10. A mobile object image tracking method comprising:

preparing at least one rotary unit configured to rotate about at least one axis;

preparing a camera sensor configured to photograph a mobile object to acquire image data, the camera sensor being supported by the rotary unit;

detecting a tracking error as a tracking error detection value, based on the image data, the tracking error being a deviation from a center of a field of view of the camera sensor;

detecting an angle of the rotary unit;

estimating the tracking error as a tracking error estimation value, using the angle and a temporal differentiation value of the angle;

selecting the tracking error detection value when the mobile object falls within the field of view, and to select the tracking error estimation value when the mobile object falls outside the field of view;

wherein selecting the tracking error detection compares the tracking error detection value with the tracking error estimation value, and adjusts the tracking error estimation value to match an amplitude of the tracking error estimation value with an amplitude of the tracking error detection value;

computing an angular velocity instruction value used to drive the rotary unit to track the mobile object, based on the angle and a selected one of the tracking error detection value and the tracking error estimation value;

detecting an angular velocity of the rotary unit; and controlling the rotary unit to make zero a difference between the angular velocity instruction value and the angular velocity.

11. The method according to claim 10, wherein estimating the tracking error acquires the tracking error estimation value, using, as the temporal differentiation value, an angular velocity dimension value obtained by signal processing of data related to the angle, and also using a relationship between the tracking error, the angle of the rotary unit, and the angular velocity of the rotary unit.

12. The method according to claim 11, wherein selecting the tracking error detection compares the tracking error detection value with the tracking error estimation value, and adjusts the tracking error estimation value to match an amplitude of the tracking error estimation value with an amplitude of the tracking error detection value.

13. The method according to claim 11, wherein computing the angular velocity instruction value computes the angular velocity instruction using the tracking error estimation value, during a time when the tracking error detection value related to the image data acquired by the camera sensor is not updated.

14. The method according to claim 11, wherein computing the angular velocity instruction value computes the angular velocity instruction value using a relationship between the tracking error, the angle of the rotary unit, and the angular velocity of the rotary unit.

15. The method according to claim 10, wherein computing the angular velocity instruction value computes the angular velocity instruction using the tracking error estimation value, during a time when the tracking error detection value related to the image data acquired by the camera sensor is not updated.

16. The method according to claim 10, wherein computing the angular velocity instruction value computes the angular velocity instruction value using a relationship between the tracking error, the angle of the rotary unit, and the angular velocity of the rotary unit.

17. The method according to claim 10, wherein computing the angular velocity instruction value computes the angular velocity instruction using the tracking error estimation value, during a time when the tracking error detection value related to the image data acquired by the camera sensor is not updated.

18. The method according to claim 10, wherein computing the angular velocity instruction value computes the angular velocity instruction value using a relationship between the tracking error, the angle of the rotary unit, and the angular velocity of the rotary unit.

\* \* \* \* \*